(12) United States Patent
Stoepler et al.

(10) Patent No.: US 6,824,744 B1
(45) Date of Patent: Nov. 30, 2004

(54) CATALYTIC CONVERTER, ESPECIALLY FOR MOTOR VEHICLES, AND METHOD FOR THE PRODUCTION THEREOF

(75) Inventors: Walter Stoepler, Herzogenaurach (DE); Thomas Buckel, Nürnberg (DE)

(73) Assignee: Faurecia Abgastechnik GmbH, Furth (DE)

( * ) Notice: Subject to any disclaimer, the term of this patent is extended or adjusted under 35 U.S.C. 154(b) by 0 days.

(21) Appl. No.: 09/555,801

(22) PCT Filed: Oct. 21, 1998

(86) PCT No.: PCT/EP98/06694

§ 371 (c)(1),
(2), (4) Date: Jun. 5, 2000

(87) PCT Pub. No.: WO99/28604

PCT Pub. Date: Jun. 10, 1999

(30) Foreign Application Priority Data

Dec. 3, 1997 (DE) ......................... 197 53 609

(51) Int. Cl.⁷ ............................ B01D 53/34; F01N 3/28
(52) U.S. Cl. ...................... 422/179; 422/177; 422/180; 29/890
(58) Field of Search ................. 422/171, 180, 422/177, 211, 179, 221, 222; 29/890

(56) References Cited

U.S. PATENT DOCUMENTS

| 3,912,459 A | 10/1975 | Kearsley | 422/129 |
| 4,347,219 A * | 8/1982 | Noritake et al. | 422/180 |
| 4,413,392 A * | 11/1983 | Otani et al. | 29/890 |
| 5,413,766 A * | 5/1995 | Dattge et al. | 422/173 |
| 5,888,457 A * | 3/1999 | Tosa et al. | 422/179 |

FOREIGN PATENT DOCUMENTS

| DE | 36 38 050 | 5/1988 |
| DE | 41 11 264 | 10/1991 |
| DE | 197 14851 | 10/1998 |
| GB | 1 473 219 | 5/1977 |
| JP | 09-112260 | * 4/1997 |
| JP | 09242533 | 9/1997 |

* cited by examiner

Primary Examiner—Hien Tran
(74) Attorney, Agent, or Firm—Venable LLP; Robert Kinberg

(57) ABSTRACT

The invention relates to a catalytic converter, especially for motor vehicles, and to a method for the production thereof. The inventive method is characterized in that a monolithic packet (17) consisting of at least one monolith (1) with wrap-around supporting matting (7) is pressed into a tube section (2) acting as a housing. The tube section (2) has two longitudinal sections (9, 10) with different inner cross-sectional surfaces. The monolithic packet (17) is pressed inwards from the end (21) of the tube section with the bigger or biggest inner cross-sectional surface. The inventive catalytic converter is characterized in that it has at least one contracted longitudinal section (9) with a reduced diameter (12) or reduced inner cross-sectional surface, whereby the inner surface (5a) of the tube section (2) runs parallel to the central longitudinal axis (32) thereof.

19 Claims, 8 Drawing Sheets

CATALYTIC CONVERTER, ESPECIALLY FOR MOTOR VEHICLES, AND METHOD FOR THE PRODUCTION THEREOF

BACKGROUND OF THE INVENTION

A standard catalytic converter, especially for motor vehicles, comprises a metal housing with a catalytic converter element positioned on the inside. A ceramic catalytic converter element, in the following called a monolith, has a far lower stability than a metallic one. In addition, the heat expansion coefficients of the ceramic material and the metallic housing are very different. The monolith is therefore positioned inside the housing with the aid of a positioning mat, which is inserted with pre-stressing into a gap between monolith and housing. So-called expanding mats are frequently used as positioning mats. These are mineral-fiber mats with exfoliated mica particles embedded therein. Exfoliated mica irreversibly hydrolyzes water vapor at increased temperatures, thereby causing the particles to change to an expanded state. In the expanded state of the exfoliated mica particles, the mat exerts higher restoring forces in radial direction onto the inside surface of the housing and the peripheral surface of the monolith, which is linked to an increase in the ejection force. The ejection force is understood to be the force with which the monolith must be admitted in axial direction to remove it from its positioning or to displace it in axial direction. For understandable reasons, the ejection force should be as high as possible to ensure a reliable positioning of the monolith during the vehicle operation.

Positioning mats that do not contain exfoliated mica are used in addition to expanding mats. Mats of this type essentially consist only of mineral fibers. The radial restoring forces of both mat types are generated in that the thickness of the mat in the uninstalled condition exceeds the gap measure for the gap space between monolith and housing. Whereas the gap enlargement for expanding mats during the operating temperatures of the catalytic converter is balanced out by the expansion of the exfoliated mica particles, the radial pre-stressing of the positioning mat of mineral fibers without exfoliated mica must be high enough to ensure that the monolith is positioned securely, even in the expanded state of the gap. As a rule, the intent is to have the smallest possible gap measure for the gap space in order to increase the restoring forces of a mat with a specified thickness. With housings consisting of two shell halves, a monolith packet consisting of one or several monoliths wrapped with a positioning mat, is initially inserted into one half shell and the second half shell is then fitted on. In the process, the positioning mat must be compressed to the thickness corresponding to the desired gap measure. While a monolith is relatively insensitive to a radially effective isostatic load, there is danger that the monolith is destroyed during the shearing stress that may result from a tangential force introduction. With a housing consisting of two shell halves, a shearing stress of this type occurs mainly along the edges of the half shells. Thus, relatively narrow limits are set for reducing the gap measure of a catalytic converter of this type. The same is true for catalytic converters having a wrap-around housing. A third type of catalytic converter design uses a tube section for the part of the housing where the monolith or monoliths are located. For the production of such catalytic converters, the above-mentioned monolith packet is pressed into a tube section. The restoring forces generated by the compression of the positioning mat in the process uniformly act upon the peripheral region of the monolith, meaning they have a quasi isostatic effect on the monolith. A shearing stress virtually does not occur. Nevertheless, the gap space in traditional tube-shaped catalytic converters cannot be reduced to a satisfactory degree for increasing the mat restoring forces. The reason for this is that pressing the monolith packet into a tube section becomes proportionally more difficult the smaller the available gap space or the greater the positioning mat thickness that exceeds the available gap measure for the gap space.

SUMMARY OF THE INVENTION

Starting with this, it is the object of the invention to suggest a catalytic converter with improved positioning of the monolith, as well as a method for producing a catalytic converter with a tubular design.

This object is solved with a method and catalytic converter according to the present invention. If reference is made to an approximately cylindrical tube section or an approximately cylindrical monolith, this also includes oval or polygonal tube sections and monoliths. In addition, a catalytic converter in general is understood to mean a device for cleaning exhaust gases, which can additionally or instead of a monolith include a particle filter or a soot filter. For a method according to the invention, a tube section with several different cross-sectional surfaces on the inside is provided, wherein a monolith packet is pressed in from a tube end with a larger or the largest inside cross-sectional surface or clear width. For example, a tube section can be selected, which has a first longitudinal section with larger inside cross-sectional surface and an adjoining second longitudinal section with smaller inside cross-sectional surface. The larger inside cross-sectional surface is selected such that the insertion of the monolith packet will not present any problems. However, the positioning mat is still compressed to generate the restoring forces. The subsequent longitudinal section with smaller inside cross-sectional surface, on the other hand, is selected so that the highest possible compression of the positioning mat occurs, thus generating the highest possible restoring forces. In contrast, the use of a tube section with on the whole reduced inside cross-sectional surface would engender the danger of the positioning mat getting snagged at the beginning of the pressing-in action, e.g. in the frontal region of the tube section, and that only the monolith would be pushed farther into the tube section. However, if a larger inside cross-sectional surface and accordingly a gap with larger gap measure exist at the pressing-in end of the tube section, the monolith packet can be pressed into the tube section without a change in the desired position of the positioning mat, relative to the monolith. If the front end of the monolith packet that points in pressing-in direction later enters the longitudinal tube section with reduced cross section, the region in front of the positioning mat is already stabilized sufficiently by the tube section, so that a change in the desired mat position is prevented. A tube section pre-manufactured in this way is arranged such that the narrowed longitudinal section encloses the frontal region of the monolith that points toward the inflow funnel.

The production of a catalytic converter according to the invention can also occur such that a monolith packet is pressed from each tube end into the tube section. In that case, both tube ends have a larger cross sectional inside surface than at least one region, arranged in-between, with reduced cross sectional inside surface. It is preferable if a tube section is used, for which the inside cross-sectional surface is reduced in stages, in the form of several longitudinal sections, wherein the inside surface of the respective longitudinal sections extends parallel to the central longitudinal axis of the tube section. In other words, the inside surface of the respective longitudinal section forms a cylinder jacket with circular, oval or polygonal periphery, which extends coaxial to the central longitudinal axis of the tube section. For one embodiment variant, the successive longitudinal sections in pressing-in direction are arranged in the order of decreasing inside cross-sectional surfaces. The positioning mat is compressed more and more with increasing depth for pressing in, until it experiences the highest compression at the end of the pressing-in operation, in the region of the tube end pointing in pressing-in direction.

As alternative to a tube section that is reduced in stages, it is also possible to use a tube section with continuously decreasing or conically tapered inside cross-sectional surface for a longitudinal section. A longitudinal section of this type can extend over the complete length of the tube section. The inside cross-sectional surface continuously decreases from one tube end to the other tube end. The inside surface of a cone-shaped longitudinal section thus forms the jacket surface of a truncated cone, wherein the periphery of this longitudinal section can also be circular, oval or polygonal. The reduction in stages as well as the continuous, cone-shaped narrowing is linked to a stiffening of the tube section or the catalytic converter housing. As compared to the continuous narrowing of the inside cross-sectional surface, a tube section that is reduced in stages has the advantage of resulting in higher friction between positioning mat and tube section.

Figure 12:
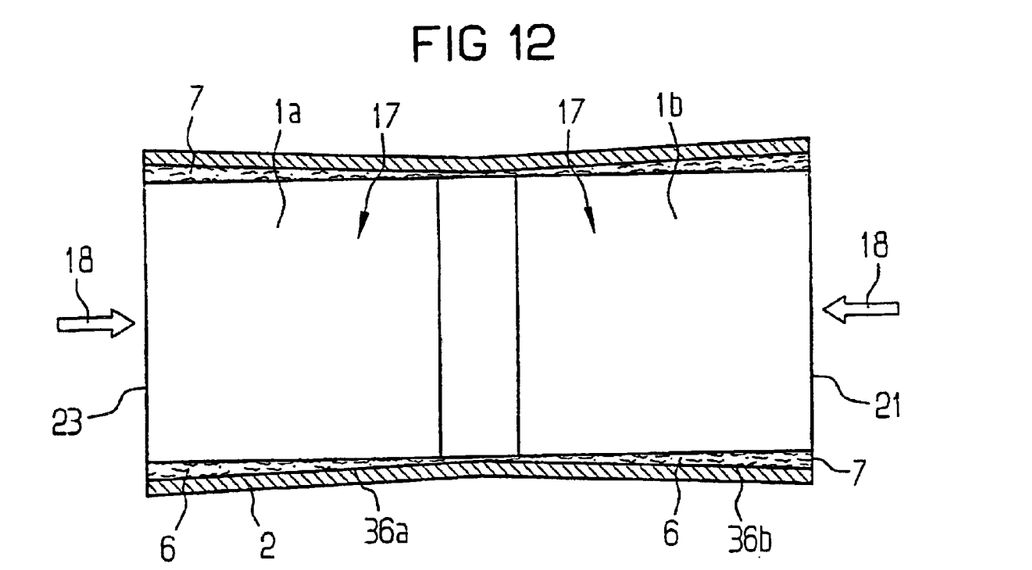
FIG. 12 A tube section with two longitudinal sections that are conically tapered from the ends toward the center.

A tube section 2 comprises longitudinal sections that are conically tapered from its tube ends toward the center. With a tube section of this type, it is useful if respectively one monolith packet is pressed in from each tube end. Finally, it can be advantageous if a tube section comprises at least one longitudinal section with an inside surface that extends parallel to its central longitudinal axis and at least one cone-shaped longitudinal section.

It is furthermore advantageous if the narrowed or the conically tapered longitudinal sections extend only over a partial peripheral region of the tube section. Monoliths with an oval or elliptical cross section can tolerate a higher pressure load in the flat areas, that is to say in the region of the smaller elliptical axis, than in the side regions with higher curvature of the longer elliptical axis. It is therefore advantageous if the total force of pressure is distributed such that the flat sides of the monoliths are subjected to a higher load than the side regions with stronger curvature. To ensure this, a tube section is used that is not narrowed over its total periphery, but only in its regions assigned to the respective flat sides of the monolith. Thus, it is possible to admit the monolith on the whole with an increased radial force of pressure without the danger of a monolith break. The reduction in the above-mentioned peripheral regions can be selected such that following the pressing in of a monolith packet, a uniform gap measure over the complete area is achieved for the gap space.

A variation of the radial force of pressure can be achieved in general in that the narrowing or tapering of the longitudinal sections is more pronounced in one partial peripheral region than in another partial peripheral region. For tube sections where the narrowing extends only to a partial peripheral region, it means that the tube section is lowered more in the direction toward its central axis in one segment of this partial peripheral region than in another segment.

Particularly advantageous is a catalytic converter according to the invention in combination with an expanding mat since mats of this type are considerably cheaper as compared to mineral fiber mats without exfoliated mica. A specific operating temperature must be achieved with such expanding mats, so that the expansion of the exfoliated mica particles is triggered. In the low load range, for example for large-volume diesel engines or for diesel and Otto engines with direct fuel injection, the expansion temperature is frequently not reached. As a result, the monolith is positioned in the catalytic converter housing solely by the initial restoring forces of the expanding mat, which are determined by the gap measure and the original mat thickness. With an expanding mat, the mineral fibers and the exfoliated mica particles are embedded in an organic binder. The organic binder mainly determines the initial restoring force of such a mat. Above approximately 160° C., the binder softens and in the process is distributed over the porous structure of the mat. The result is a loss of restoring force or a drop in the radial pressure forces exerted onto the monolith. Added to this is the fact that the binder hardens through partial oxidation as a result of being admitted with heat over a longer period of time at the aforementioned temperature range. This results in an additional and considerable reduction in the axial forces of pressure. This is further reinforced by the fact that vibrations resulting from the vehicle operation cause a steady compression of the positioning mat in radial direction and, as a result of the hardened binder, practically cause a permanent deformation or condensing of the mat. It can go so far as to release the monolith from its anchorage owing to the axial accelerations caused by the engine vibrations and exhaust gas pulsations. With a catalytic converter according to the invention that is produced according to the invention, however, this problem is prevented by selecting the inside cross-sectional surface of the narrowed housing section such that the positioning mat is compressed or pre-stressed to such a degree that a reliable holding of the monolith is ensured, even in the aforementioned low-load ranges or for engines with low heat development. Finally, the reduction in the inside cross-sectional surface can be selected so as to compensate for the production tolerances of the monolith and the tube section, which have an enlarging effect on the gap space, and thus lower the ejection force to below an operationally safe desired minimum value. Thus, the invention offers the further advantage of being able to dispense with an individual calibration of the tube sections. For a calibration of this type, an individual monolith is assigned to each tube section, the cross-sectional surface of the monolith is determined and the tube section is enlarged to achieve the desired gap measure.

BRIEF DESCRIPTION OF THE DRAWINGS

In the following, the invention is explained further with the aid of exemplary embodiments in the attached drawings, which show in.

DETAILED DESCRIPTION OF THE INVENTION

Figure 1:
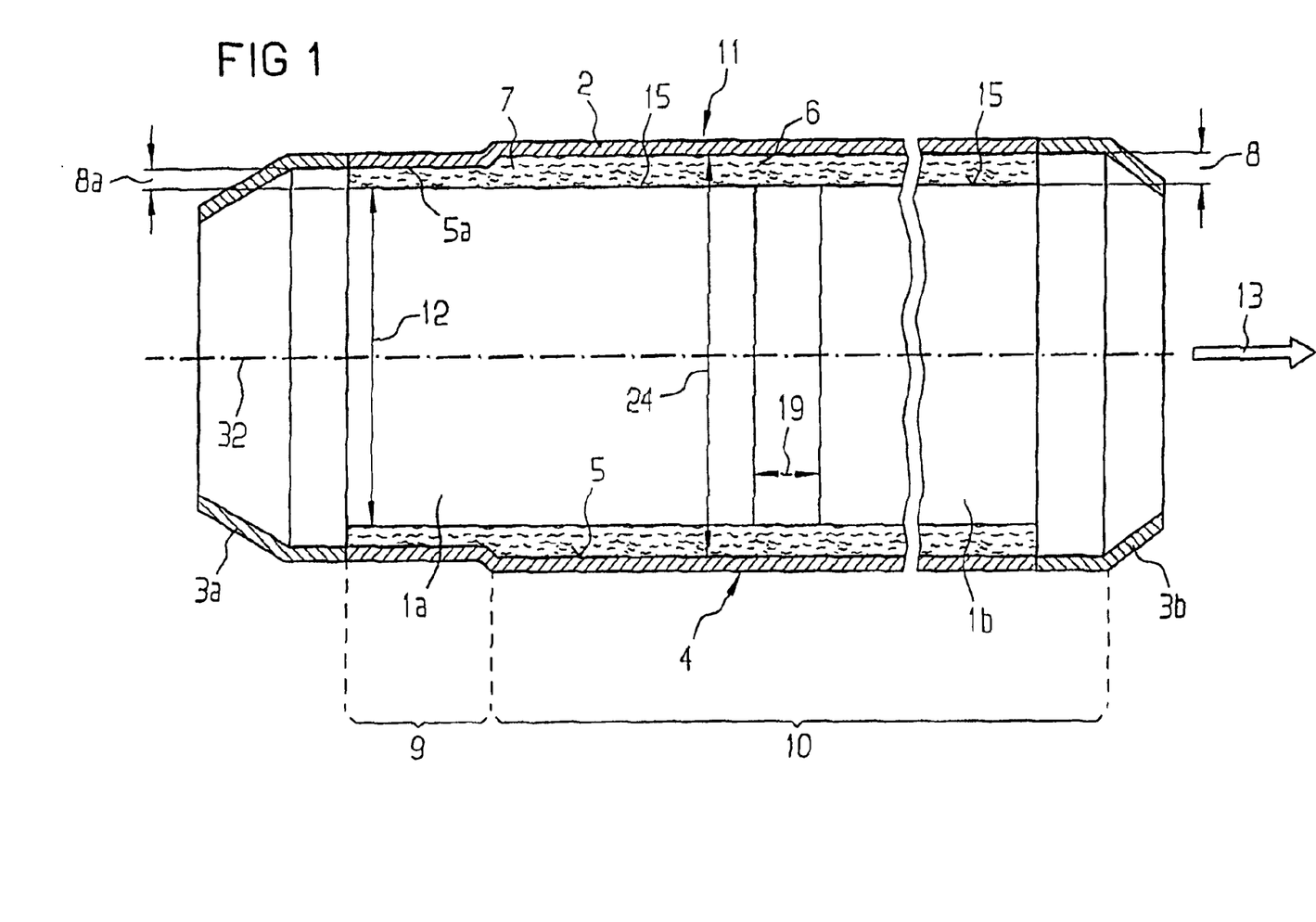
FIG. 1 A schematic representation of a catalytic converter according to the invention, for which a tube section holding two monoliths shows only one narrowed longitudinal section.

For the catalytic converter shown in FIG. 1, a tube section 2 forms the positioning area 11 of the housing 4, which accommodates two monoliths 1a, 1b. The tube section 2 has an inflow funnel 3a attached on one front and an outflow funnel 3b on the other front. The housing 4 of the catalytic converter thus is composed of the tube section 2, the inflow funnel 3 and the outflow funnel 3b. The tube section 2 is cylinder-shaped, but can also be oval or have any other optional outline. A gap space 6 with ring-shaped cross section is provided between the peripheral region 15 of monoliths 1a, 1b and the inside surface 5 of tube section 2. A positioning mat 7 is embedded with radial pre-stressing in the gap space 6. The pre-stressing is due to the fact that the positioning mat has a greater thickness prior to the installation than the gap measure 8 of the gap 6. The positioning mat is a so-called expanding mat, meaning it consists essentially of mineral fibers with embedded exfoliated mica particles and the organic binder. In principle, mats without exfoliated mica particles can also be used. The tube section is divided into two longitudinal sections 9, 10. The longitudinal section 9 has a smaller diameter 12 and a smaller inside cross-sectional surface than the longitudinal section 10 that follows in flow direction 13. Accordingly, the longitudinal section 9 with inserted monolith 1a has a smaller gap measure 8a than the longitudinal section 10. The compression of the positioning mat 7 is increased in the longitudinal section 9. The radial restoring forces exerted by the positioning mat 7 onto the inside surface 5 and on the peripheral region 15 of monolith 1a are increased accordingly. As a result of the increased compression of the positioning mat 7 in the longitudinal section 9, an erosion protection for the frontal edge region 17 of the positioning mat can be omitted. The mat fibers are compressed to such a degree in this area that an erosion through the arriving exhaust flow is prevented or at least reduced. The inside surface 5a of the tube section, which is assigned to a longitudinal section 9, 10, extends parallel to its central longitudinal axis 32 or forms a cylinder jacket that extends coaxial to the central longitudinal axis 32 of the tube section.

In order to produce the catalytic converter shown in FIG. 1, for example, a monolith packet 17 of two monoliths 1a, 1b with a positioning mat 7 that is wrapped in one layer around the monoliths is pressed in pressing direction 18 into a tube section 2. The tube section 2 is held inside a tube holder 20. The longitudinal section 10 with its larger inside cross-sectional surface and its larger diameter 12 extends to the tube end 21 of tube section 2, which points counter to the pressing in direction 18. The longitudinal section 10 changes by means of a stage or a slanted shoulder 22 into the narrowed longitudinal section 9. The longitudinal section 9 extends to the other tube end 23 of the tube section 2. The difference between the diameter 12 of the reduced longitudinal section 9 and the diameter 24 of the non-reduced longitudinal section 10 amounts to only a few tenths of millimeters. In the FIGS. 1–11, these differences are exaggerated for reasons of clarity and also for drawing reasons. In order to make it easier to insert the monolith packet 17 into the tube section 2, an insertion funnel 25 is fitted onto the upper front end of tube holder 20. The slanted insertion area 26 of the insertion funnel 25 essentially extends to the tube end 21 of tube section 2. The distance 19 between the two monoliths 1a, 1b is ensured by an approximately ring-shaped spacer 27, for example made of ice or dry ice. The monolith packet 17 is inserted into the tube section 2 by a pressing die 28 that is pushed forward in pressing direction 18.

Figure 7:
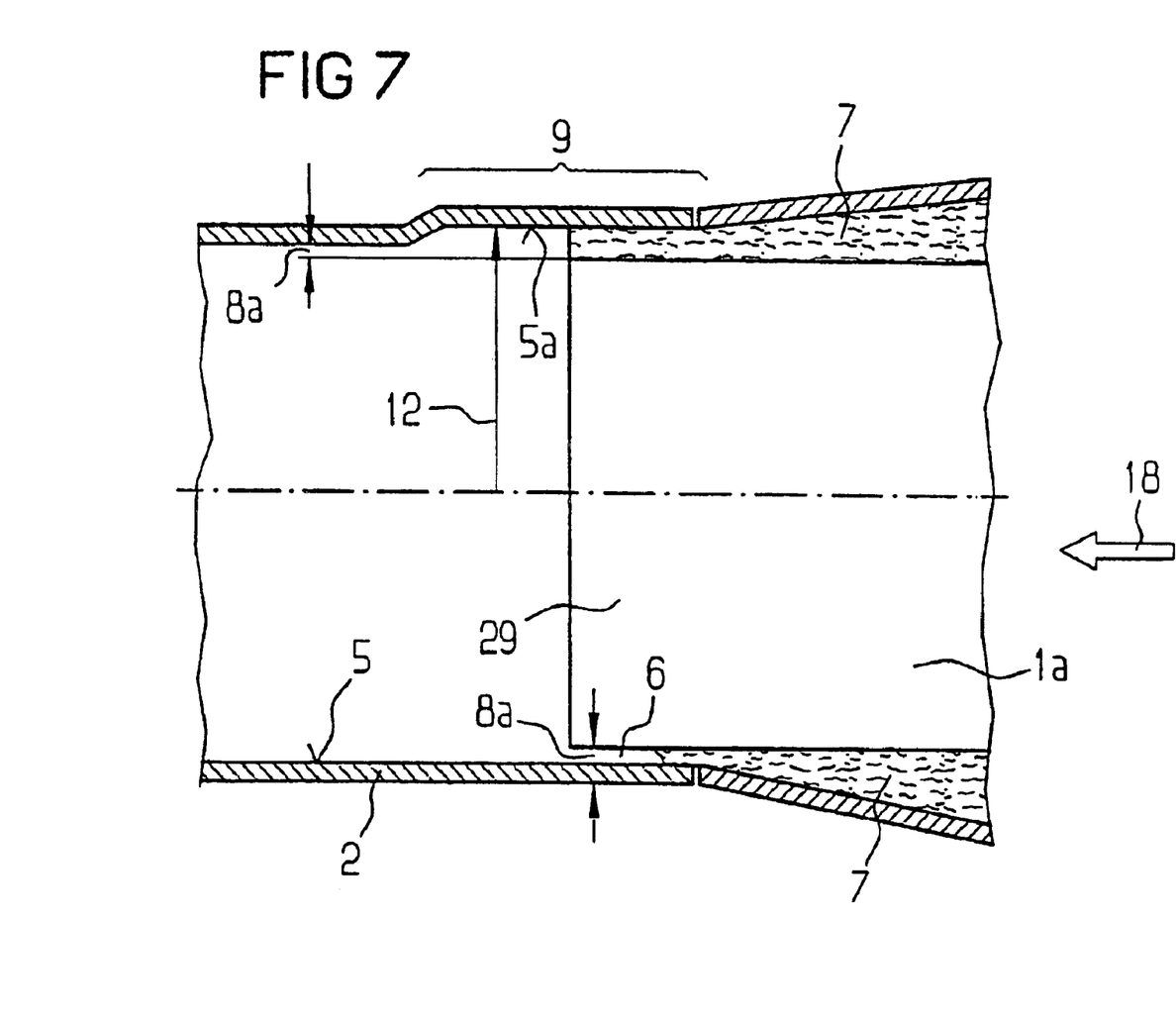
FIG. 7 A schematic representation showing the initial phase during which a monolith packet is pressed into a tube section.

FIG. 7 shows the tube end 21 of tube section 2, with partially inserted monolith packet 17 for explaining the starting phase of the pressing-in operation. The bottom half of the Figure illustrates the problems that can occur with a gap 6 with relatively small gap measure 8a. In the starting phase of the pressing-in operation, in which the monolith packet 17 is not yet completely inserted or is only slightly inserted into the tube section 2, the monolith 1a is surrounded only loosely by the positioning mat 7. If a narrow gap space 6 exists between the monolith 1a and the inside surface 5 of tube section 2, the positioning mat 7 encounters such a high resistance upon entering the tube section 2 that it remains behind as the monolith 1a is pushed forward in pressing direction 18, so that finally only the monolith is inserted into the tube section 2. However, if, as shown in the top half of FIG. 7, the longitudinal section 9 that adjoins the tube end 21 has a larger inside cross-sectional surface and a diameter 12, the positioning mat 7 is accordingly compressed less. The frictional resistance between the inside surface region 5a of the longitudinal section 9 and the positioning mat 7 is also correspondingly smaller. The final compression of the positioning mat 7 occurs after a region of the monolith packet, which corresponds to the length of section 9, has already been inserted into the tube section 2. The positioning mat 7 is then clamped down or stabilized in this region, such that a pushing back of the positioning mat during the transition to the narrowed gap with its smaller gap measure 8a is practically impossible, as can be seen in FIG. 7.

Figure 2:
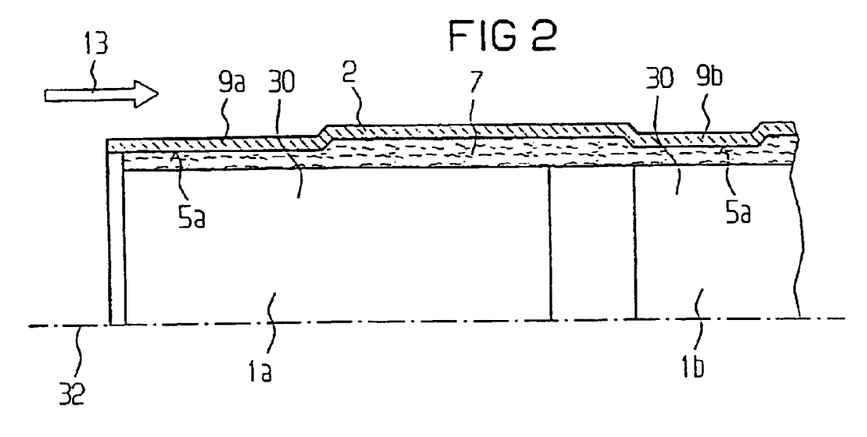
FIG. 2 A catalytic converter with a tube section holding two monoliths where a reduced longitudinal section is assigned to each monolith.
Figure 3:
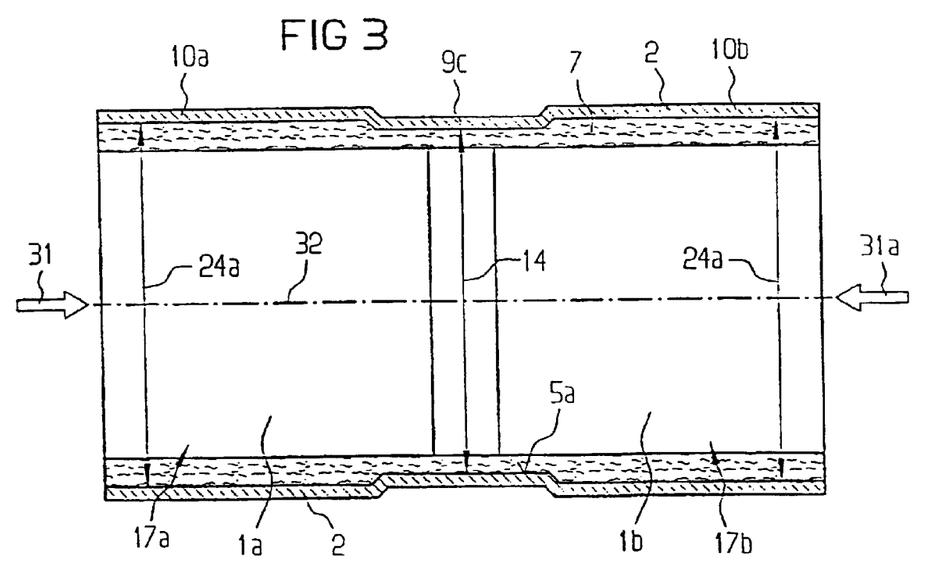
FIG. 3 A catalytic converter with a tube section where a narrowed longitudinal section that is arranged approximately in the center is flanked by two longitudinal sections with larger inside cross-sectional surfaces.

The inflow funnel and the outflow funnel are omitted in FIGS. 2–5 and 8–12 for reasons of simplicity. FIG. 2 shows a tube section 2 with two monoliths 1a and 1b. The frontal regions 30 of these monoliths, which point counter to the flow direction 13, are respectively surrounded by a narrowed longitudinal section 9a, 9b. This arrangement is useful if not only the frontal monolith 1a, but also the successive monolith 1b in flow direction 13 must be positioned extremely securely, for example if this monolith is also admitted with a strong exhaust gas flow. For the exemplary embodiment shown in FIG. 3, a narrowed longitudinal section 9c is arranged approximately in the center of tube section 2 and covers the frontal regions of monoliths 1a and 1b, which face each other. The narrowed longitudinal section 9c is flanked by two longitudinal sections 10a and 10b, which have an inside cross-sectional surface or diameter 24a that is larger than the diameter 14 of the longitudinal section 9c. The inside surfaces 5a that are assigned to the aforementioned longitudinal sections essentially form a cylinder jacket that extends coaxial to the central longitudinal axis 32 of the tube section 2. In order to produce a catalytic converter using a tube section according to FIG. 3, a first monolith packet 17a is initially inserted in insertion direction 31 and a second monolith packet 17b is inserted subsequently or simultaneously in insertion direction 31a into the tube section 2.

Figure 4:
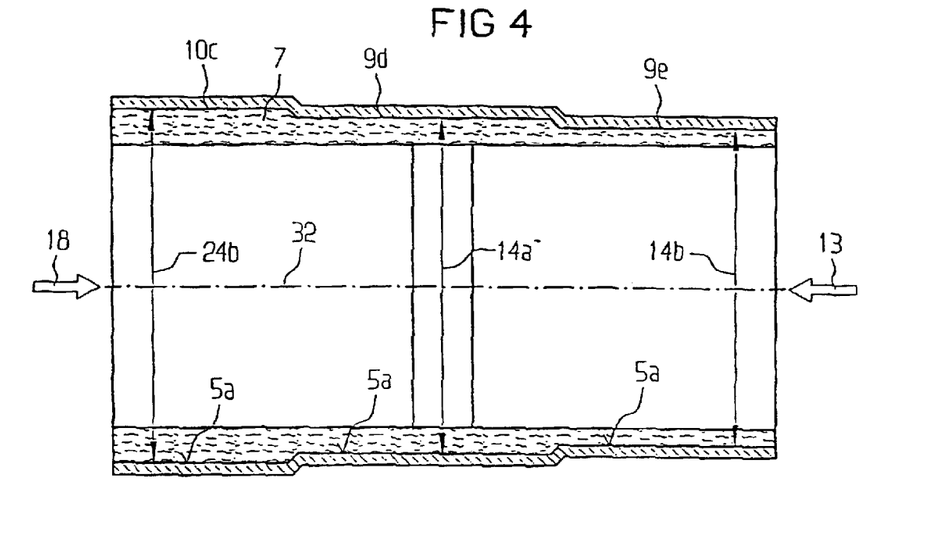
FIG. 4 A catalytic converter, having a tube section with successive longitudinal sections in pressing-in direction that are arranged according to decreasing inside cross-sectional surfaces.

For the exemplary embodiment shown in FIG. 4, three longitudinal sections 10c, 9d and 9e are arranged in pressing-in direction 18 according to the decreasing inside cross-sectional surfaces or diameters 24b, 14a and 14b. The inside surface 5a for the respective longitudinal sections in this case also essentially forms a coaxially extending cylindrical jacket.

Figure 5:
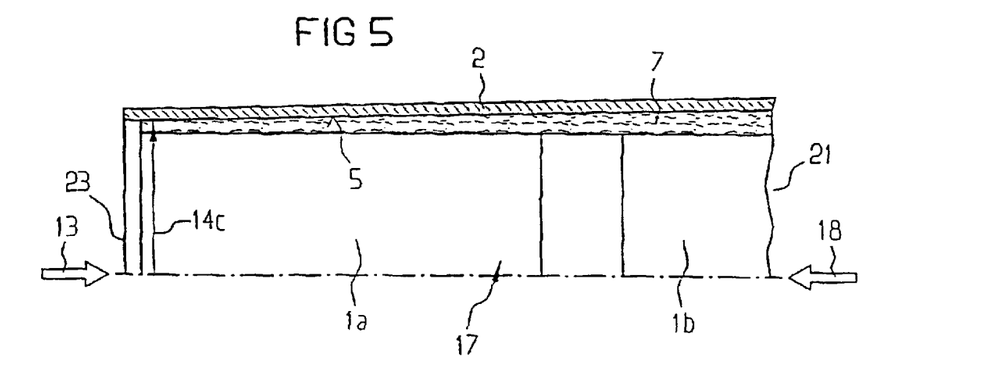
FIG. 5 A catalytic converter with conical housing.
Figure 6:
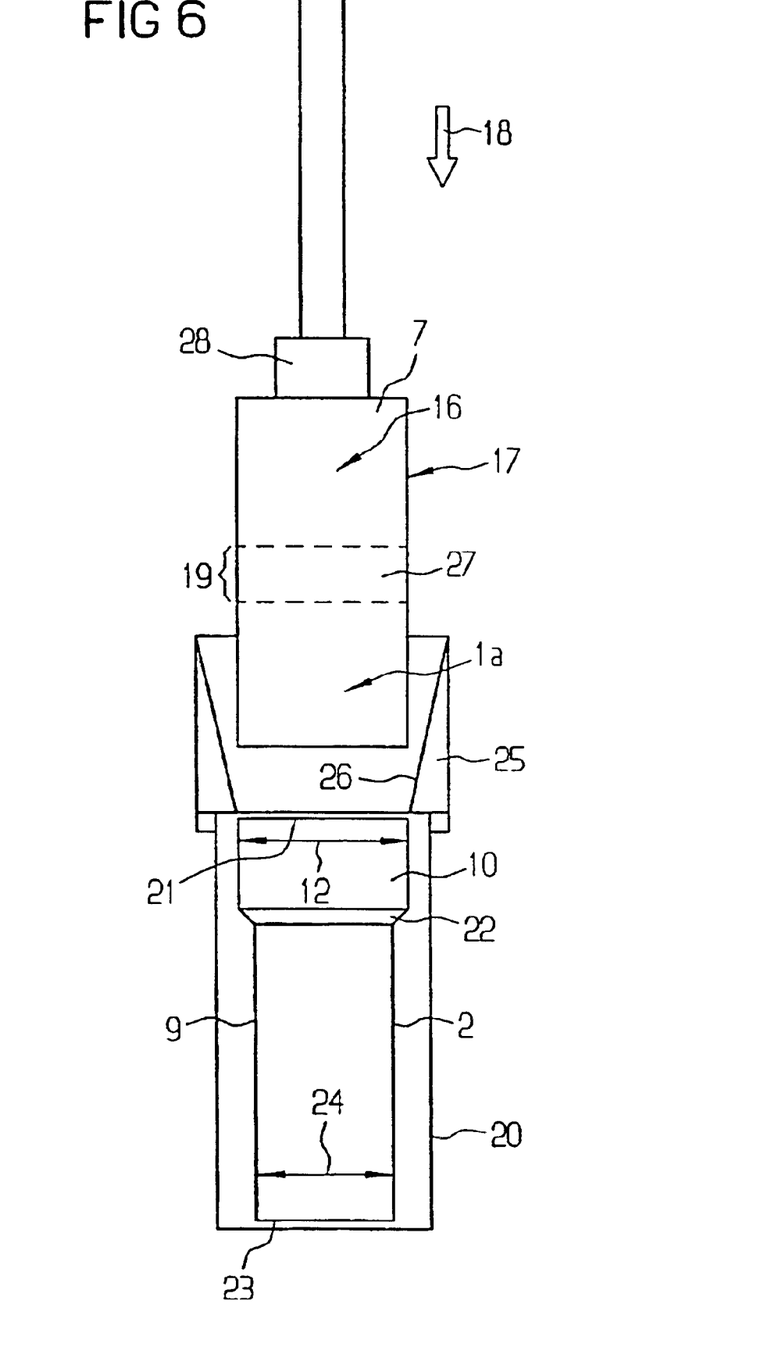
FIG. 6 A schematic representation showing a monolith packet being pressed into a tube section.

FIG. 5 shows an exemplary embodiment where the inside cross-sectional surface or the diameter 14c is reduced continuously from one tube end 21 toward the other tube end 23. The tube end 23, which points in counter-flow direction in the assembled state, has the smallest diameter 14c. The inside cross-sectional surface increases continuously toward the other tube end 21. The inside surface 5 of the tube section 2 thus essentially forms the jacket surface of a truncated cone. In order to produce a catalytic converter using a tube section 2 according to FIG. 5, for example, a monolith packet 17 with two monoliths 1a and 1b is inserted in pressing-in direction 18 from the tube end 21 with the largest diameter.

Figure 8:
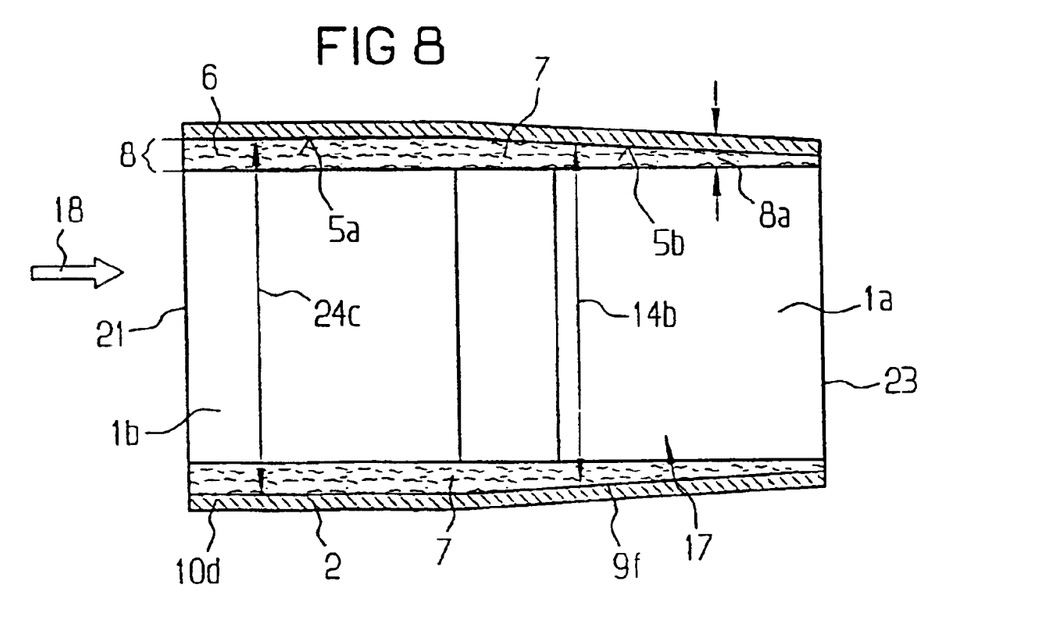
FIG. 8 A catalytic converter with a cylindrical and a conical longitudinal section.

For the catalytic converter according to FIG. 8, longitudinal sections with a cylindrical, jacket-type inside surface 5a are combined with sections having a conical inside surface 5b. A first longitudinal section 10d with essentially cylindrical inside surface 5a and diameter 24c is followed by a narrowed section 9f, which is conically tapered toward the tube end 23. The diameter 14b or the gap measure 8a of gap space 6 accordingly decreases in the direction of the tube end 23. In order to produce such a catalytic converter, a monolith packet 17 is pushed from tube end 21 in pressing-in direction 18 into the tube section 2.

The inventive idea of a gap space that is narrowed in stages or conically can in principle also be used for catalytic converters with housings consisting of half shells or wrap around housings. In the first case, the half shells used for the housing comprise at least two longitudinal sections, wherein one longitudinal section is narrowed according to the invention. For a wrap-around housing, a sheet metal blank with at least two longitudinal sections is used, wherein the one longitudinal section is raised from the planar surface of the other longitudinal section. In the finished catalytic converter, the raised longitudinal section then forms a narrowed longitudinal section for the housing region holding a monolith.

Figure 9:
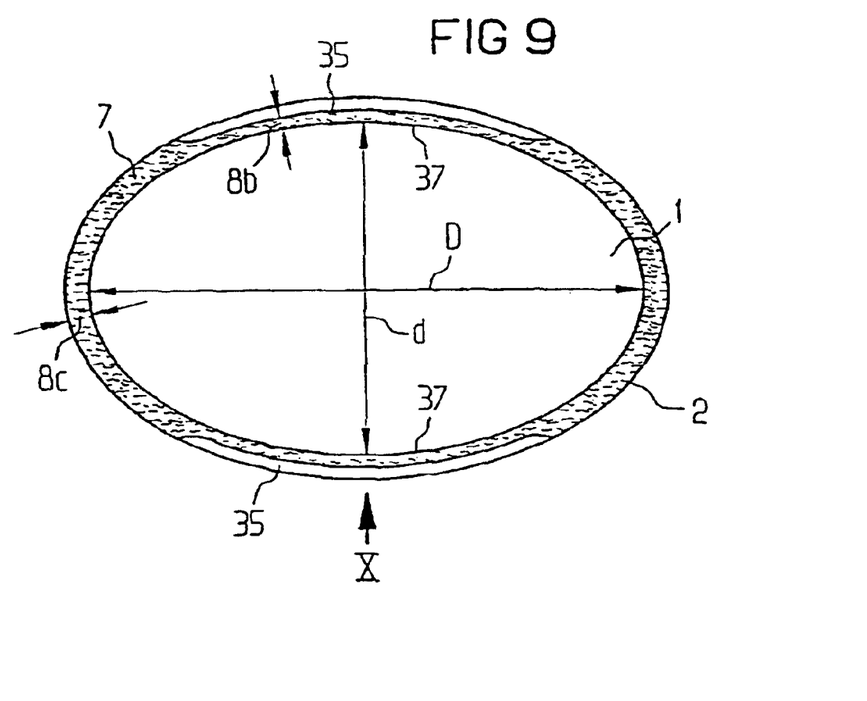
FIG. 9 A view from above of a tube section for a catalytic converter, for which the reduced longitudinal sections extend only over a partial peripheral region.
Figure 10:
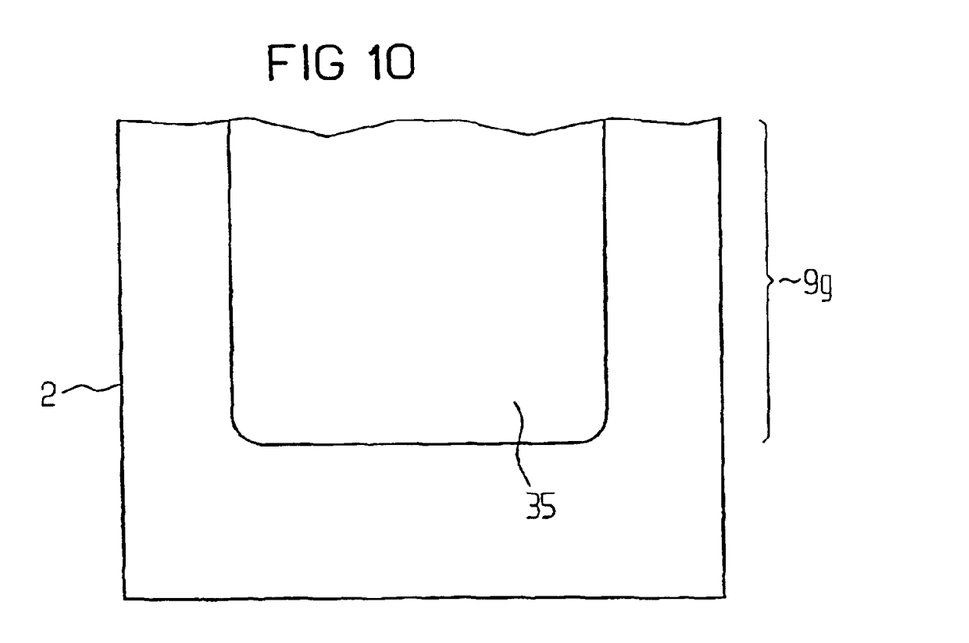
FIG. 10 A view of the tube section according to FIG. 9 in the direction of arrow X.

FIG. 9 shows a tube section 2 with oval or ellipsoid outline. It contains a longitudinal section 9g that extends only over two partial peripheral regions 35, which are arranged opposite in the direction of the small elliptical axis d. These partial regions are lowered approximately in the direction toward the center of monolith 1. As a result, a gap space 6 with reduced gap measure 8b is created in the region of the flat sides 37 of the monolith. The surface pressure for the positioning mat 7 is therefore increased in this region and the radial force of pressure exerted on the monolith 1 is increased correspondingly. In contrast, the surface regions with stronger curvature of monolith 1 are admitted with a lower radial force of pressure in the region of its large elliptical axis D, owing to the fact that the gap measure 8c is smaller there. FIG. 10 clearly shows that the longitudinal section 9g with its reduced partial peripheral sections 35 extends only over a portion of the length of tube section 2.

Figure 11:
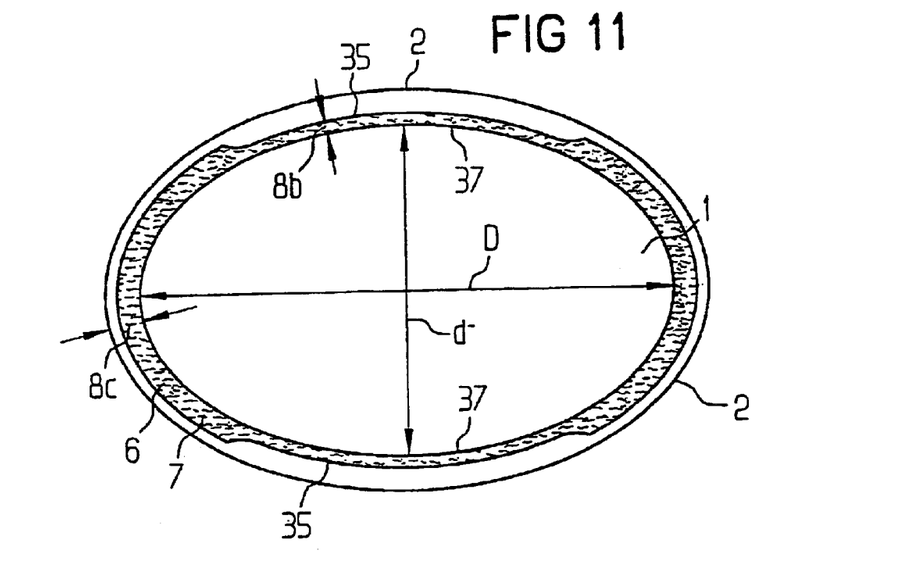
FIG. 11 An illustration of a tube section according to FIG. 9, with a narrowed longitudinal section that extends over the total periphery of the tube section, but for which two partial peripheral regions are narrowed more than the other two.

With the tube section shown in FIG. 11, a narrowed longitudinal section is shown across the complete periphery. However, the narrowing of the inside cross-sectional surface is more pronounced in the region of the flat sides 37 of the monolith than in the peripheral regions on the side of the monolith, which have a stronger curvature. In contrast to the cross-sectional surface of the original or non-reduced tube section 2, the monolith is therefore surrounded in the region of the narrowed longitudinal monolith section by a gap space 6, which is on the whole narrowed. As a result of the aforementioned design, however, the gap measure 8b is smaller in the region of the flat sides than the gap measure 8c in the peripheral region with stronger curvature on the side of monolith 1.

FIG. 12 finally shows an exemplary embodiment where a tube section 2 comprises two longitudinal section 36a, 36b, which are conically tapered toward its center. Accordingly, the gap space 6 in continually reduced from the tube ends 23, 21 toward the center. When producing a catalytic converter by using a tube section of this type, a monolith packet 17 is pressed into each tube end 21, 23 in directions 18.

REFERENCE NUMBER LIST 1 monolith
2 tube section
3a inflow funnel
3b outflow funnel
4 housing
5 inside surface
6 gap space
7 positioning mat
8 gap measure
9 longitudinal section
10 longitudinal section
11 positioning region
12 diameter
13 flow direction
14 diameter
15 peripheral region
16 frontal edge region
17 monolith packet
18 pressing-in direction
19 distance
20 tube holder
21 tube end
22 slanted shoulder
23 tube end
24 diameter
25 insertion funnel
26 slanted insertion area
27 spacer
28 pressing die
29 frontal region
30 frontal region
31 insertion direction
32 central longitudinal axis
33 longitudinal section
34 longitudinal section
35 partial peripheral region
36 longitudinal section
37 flat side d small elliptical axis
D large elliptical axis

What is claimed is:

1. A method for producing a catalytic converter, comprising:
   wrapping a mineral fiber positioning mat around a monolith packet to form a monolith packing;
   radially prestressing the mineral fiber mat;
   pressing in a pressing-in direction the at least one monolith packing into a tube section forming a positioning area, the tube section being utilized to increase restoring forces exerted by the mineral fiber mat onto the monolith, the positioning area comprising at least two longitudinal sections that extend parallel to a longitudinal axis of the tube section, wherein at least two of the longitudinal sections have different internal cross-sectional area such that the longitudinal sections decrease in cross-sectional area in the pressing-in direction and the monolith packing is pressed in starting from a tube end having a larger cross-sectional area.

2. The method according to claim 1, wherein the monolithic packet comprises at least two monoliths, and wherein the method includes pressing in each of the at least two monoliths into at least two successive longitudinal sections with decreasing internal cross-sectional areas in the pressing-in direction.

3. The method according to claim 1, wherein the tube section comprises two tube ends, and at least two successive longitudinal sections with decreasing internal cross-sectional areas extend in a respective pressing in direction from each end, the method comprising pressing in a pressing-in direction a monolithic packing at each tube end.

4. The method according to claim 3, wherein the tube section comprises a first end, a second end, and a first longitudinal section extending from each of the first end and the second end, wherein the first longitudinal sections extend from the first end and the second end enclose a second longitudinal section having smaller internal cross-sectional area, the second longitudinal section extending across end regions of two monoliths that face each other.

5. The method according to claim 1, wherein the tube section comprises three successively following longitudinal sections that decrease in cross-sectional area in the pressing-in direction.

6. The method according to claim 5, wherein the monolithic packet comprises two monoliths, and the method includes pressing in and positioning the two monoliths into the tube section such that the center longitudinal section extends across end regions of the two monoliths, which face each other.

7. The method according to claim 1, wherein the at least two longitudinal sections extend only across a portion of a periphery of the tube section.

8. The method according to claim 1, wherein one of the longitudinal sections includes a peripheral area having a further reduced cross-sectional area.

9. The method according to claim 1, wherein the positioning mat comprises embedded exfoliated mica particles.

10. A catalytic converter, comprising:
    a housing comprising a tube section forming a positioning area, an inflow funnel and an outflow funnel, the positioning area comprising at least two longitudinal sections that extend parallel to a longitudinal axis of the tube section, wherein a first of the longitudinal sections extends away from a first end of the tube section and is followed by a second of the longitudinal sections having a reduced cross-sectional area;
    at least one monolith arranged in the positioning region;
    a mineral-fiber mat with radial pre-stressing; and
    a gap space arranged between a peripheral surface of the monolith and an internal surface of the housing and accommodating the mineral-fiber mat with radial pre-stressing.

11. The catalytic converter according to claim 10, wherein the positioning area accommodates a monolithic packet comprising at least two monoliths, wherein each monolith is arranged in two of the longitudinal sections.

12. The catalytic converter according to claim 10, wherein the tube section comprises a first end and a second end and a positioning area extends from each of the first end and the second end.

13. The catalytic converter according to claim 10, wherein the tube section comprises a first end and a second end, wherein a first longitudinal section extends from each of the first end and the second end, wherein the longitudinal sections enclose a longitudinal section having a reduced internal cross-sectional area constituting the second longitudinal section, and wherein the second section extends across end regions of two monoliths that face each other.

14. The catalytic converter according to claim 10, wherein the positioning region comprises three successively following longitudinal sections that extend with decreasing internal cross-sectional area from the first end of the tube.

15. The catalytic converter according to claim 14, wherein two monoliths are positioned in the three longitudinal sections, such that the center longitudinal section extends across end regions of the monoliths that face each other.

16. The catalytic converter according to claim 10, wherein the second longitudinal section having a reduced cross-sectional area extends only over a partial peripheral area of the tube section.

17. The catalytic converter according to claim 10, wherein the second longitudinal section having a reduced cross-sectional area has a reduction in a cross-sectional area that is more pronounced in one partial peripheral area than in another partial peripheral area.

18. The catalytic converter according to claim 10, wherein the positioning mat comprises embedded exfoliated mica particles.

19. The catalytic converter according to claim 10, wherein the second longitudinal second having reduced longitudinal cross-sectional area encircles a region of the monolith that is facing counter to a flow direction.

* * * * *